H. H. HOGSETT.
FLUME GATE.
APPLICATION FILED SEPT. 20, 1911.
1,049,091.
Patented Dec. 31, 1912.
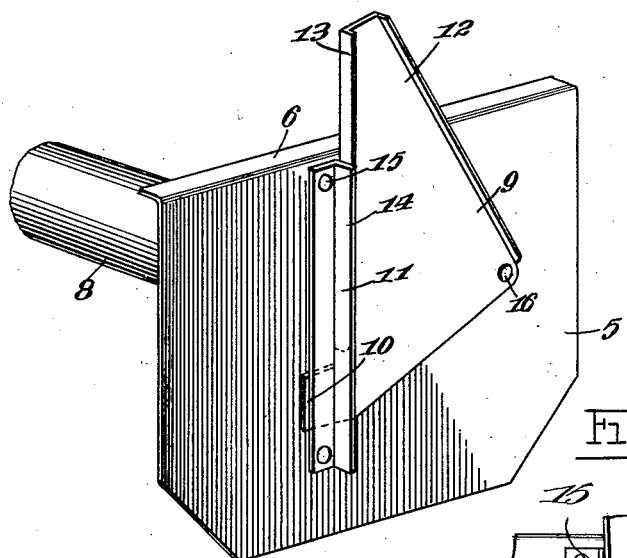
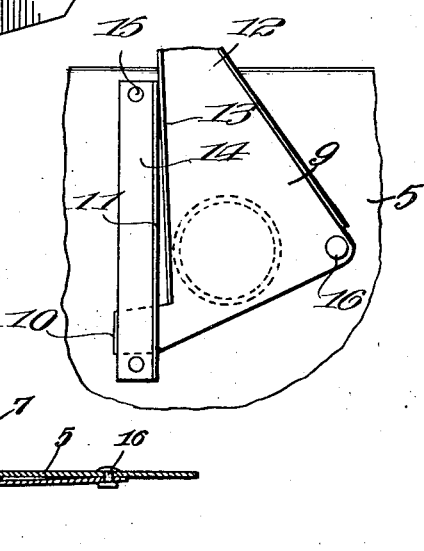
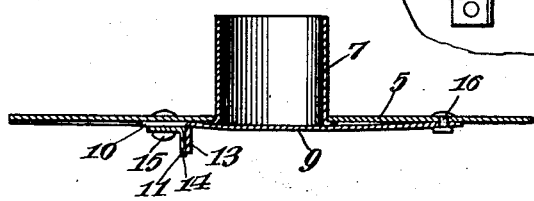
Inventor
Homer H. Hogsett
Witnesses
M. H. Slifer
N. K. McGee
By Victor J. Evans
Attorney

UNITED STATES PATENT OFFICE.

HOMER H. HOGSETT, OF SOUTH HEIGHTS, PENNSYLVANIA.

FLUME-GATE.

1,049,091. Specification of Letters Patent. Patented Dec. 31, 1912.

Application filed September 20, 1911. Serial No. 650,335.

*To all whom it may concern:*

Be it known that I, HOMER H. HOGSETT, a citizen of the United States, residing at South Heights, in the county of Beaver and State of Pennsylvania, have invented new and useful Improvements in Flume-Gates, of which the following is a specification.

The general object of the invention is the provision of a means for controlling the flow of water through the supply or main, or laterals and sub-laterals of an irrigation system, and to this end the invention consists in a gate comprising a body portion adapted to be forced into the side walls and bottom of a ditch, and further adapted to be connected to a flume and having an angularly adjustable gate arranged so as to be adjusted to control the passage through the flume, and further adapted to be held in any of its adjusted positions.

Other objects will appear and be better understood from the following description taken in connection with the accompanying drawings, in which, Figure 1 is a perspective view of a gate attached to an irrigation flume. Fig. 2 is a detail cross section of the device. Fig. 3 is a detail front elevation of the gate in closed position.

5 indicates the body which may be of any desired material such as galvanized sheet iron or steel. This body is by preference driven through the side walls of the irrigation ditch until its lower edge penetrates the bottom of the ditch for any desired distance.

In order to facilitate the operation of arranging the body in the ditch as just described, the upper marginal portion of the body may be provided with a relatively wide bearing surface preferably formed by bending the said marginal portions at right angles as indicated at 6. With the body arranged in the ditch as just described and if necessary additionally retained by banking earth around a portion of one of its faces, it will be seen that the body will effectively obstruct the free flow of water through the ditch extending beyond one face thereof. By preference the device is arranged at the head or inlet ends of laterals and sub-laterals, the former being supplied from the main, and the latter from the laterals.

The sleeve 7 which extends through the body 5 is adapted to connect with the flumes in the main or laterals as the case may be. Referring now to the drawings and especially to Fig. 2, it will be seen that the sleeve 7 has one end extending for a suitable distance beyond one face of the body so as to provide a relatively large bearing surface for the flume 8 shown in Fig. 1, while the opposite end portion of the sleeve is rolled and bears on the adjacent face of the body.

The gate *per se* is designated by 9 and arranged so as to be moved over the rolled end of the sleeve and to contact therewith, a projection 10 on the gate being frictionally held between a guide strip 11 and one face of the body, whereby, to slightly warp or strain the gate so as to cause it to tightly bind on the rolled end of the sleeve 7, but not sufficiently tight to prevent movement of the gate under an ordinary hand pull.

The gate 9 may be formed of the same material as the body 5 or of different material if desired, and by preference it is narrowed at one end as indicated at 12 so as to be conveniently grasped and operated by hand. It is additionally provided with means to prevent its sharp edges from cutting the hand of the operator, such means constituting flanges preferably formed by bending the sides of the gate as indicated by 13. One of these flanges, namely that on the left in Fig. 1, in addition to performing the above stated function also coöperates with a flange or abutment 14 on the guide 11 to form a stop, whereby, to limit the swinging movement of the gate in one direction. The projection 10 also serving to limit swinging movement of the gate in the opposite direction by abutting the connected upper end portion of the guide strip 11. The guide strip 11 may be connected in any preferred manner to the body 5 such as by tacks or rivets 15, and the gate 9 is by preference connected to the body by means of the pivot 16.

From the foregoing it will have been observed that the device is exceedingly simple in construction and the gate adapted for easy adjustment and arranged so as to control the passage through the sleeve, whereby, to vary the amount of water passing through the sleeve.

Although I have shown and described one embodiment of my invention it is to be understood that I am not to be limited to the specific arrangement and construction of parts since various changes will be made, within the scope of the appended claims without departing from the spirit or sacrificing any of the advantages of the invention.

What I claim as new is:

1. A flume gate comprising a body portion having a passage adapted for connection to a flume, and an angularly movable gate connected to the body portion and arranged to control the passage thereof.

2. A flume gate comprising a body portion having a passage adapted for connection to a flume, and an angularly adjustable gate connected to the body portion and arranged to control the passage thereof.

3. A flume gate comprising a body portion, a sleeve adapted for connection to a flume and extending through the body portion and provided with a rolled edge, a gate controlling the passage through the sleeve and means for warping the gate so as to bind on the rolled edge of the sleeve, for the purpose described.

4. A device of the class described comprising a body portion provided with a sleeve, a gate pivoted to the body portion and adapted to control the passage through the sleeve, and a guide for the gate.

5. In a device of the class described, the combination with a body portion provided with a passage; of a gate pivoted to the body portion and adapted for controlling said passage, a guide for the gate and co-operating structures associated with the guide and gate for limiting the movement of the same in either direction.

In testimony whereof I affix my signature in presence of two witnesses.

HOMER H. HOGSETT.

Witnesses:
H. I. SAYRE,
B. F. HOGSETT.